United States Patent [19]

Savage et al.

[11] Patent Number: 4,954,958

[45] Date of Patent: Sep. 4, 1990

[54] DIRECTIONAL INFORMATION SYSTEM

[75] Inventors: Charles Savage, Chester; Frank G. Barone, Jr., Florida; Gregory Demetrious, Chester, all of N.Y.; Vincent Volpe, Haworth, N.J.

[73] Assignee: Hacowie Corporation, Monroe, N.Y.

[21] Appl. No.: 234,264

[22] Filed: Aug. 19, 1988

[51] Int. Cl.$^5$ ............................................. G06F 15/50
[52] U.S. Cl. ...................................... 364/444; 364/436
[58] Field of Search ............... 364/444, 436, 424.02, 364/449, 443; 340/990, 995

[56] References Cited

U.S. PATENT DOCUMENTS

| | | | |
|---|---|---|---|
| 4,301,506 | 11/1981 | Turco et al. | 364/436 |
| 4,428,057 | 1/1984 | Setliff et al. | 364/521 |
| 4,481,584 | 11/1984 | Holland | 364/436 |
| 4,546,439 | 10/1985 | Esparza | 364/444 |
| 4,570,227 | 2/1986 | Tachi et al. | 364/444 |
| 4,642,775 | 2/1987 | Cline et al. | 364/424.02 |
| 4,733,356 | 3/1988 | Haeussermann et al. | 364/424.02 |
| 4,758,959 | 7/1988 | Thoone et al. | 364/449 |
| 4,780,717 | 10/1988 | Takanabe et al. | 340/995 |
| 4,812,843 | 3/1989 | Champion et al. | 340/905 |

FOREIGN PATENT DOCUMENTS

| | | |
|---|---|---|
| 0020939 | 1/1981 | European Pat. Off. |
| 0110099 | 6/1984 | European Pat. Off. |
| 8804029 | 6/1988 | World Int. Prop. O. |

OTHER PUBLICATIONS

Landis, "Let a Computer be your navigator," 10/19/87, USA Today, section 13E.

J. R. Davis and T. F. Trobaugh, "Direction Assistance", dated Dec. 1987, Technical Memo.

J. R. Davis, "A Voice Interface to a Direction Giving Program", incorrectly dated.

"A Novel Approach To Automotive Navigation And Map Display", Stanley K. Honey and Walter B. Zavoi, IIEE Proceedings of COMPCON 86, Mar. 3-6, 1986.

"MICRO-MILEMAKER ®", Rand McNally-TDM, Inc. 1987.

"MapInfo" and Geovision and Oakridge Routing Model, Feb. 1988.

Primary Examiner—Thomas G. Black
Attorney, Agent, or Firm—Brumbaugh, Graves, Donohue & Raymond

[57] ABSTRACT

The present invention relates to a method and system for enabling a user to determine a desired geographical route between supplied locations. To this end, a means is employed for supplying to a central processor information identifying geographic locations. The central processor, after correlating the identifying information to geographic locations, generates routing directions for travel between the two locations. The routing directions are made available for outputting to the user through a plurality of output devices.

15 Claims, 15 Drawing Sheets

HOLD REQUEST MESSAGE:
CREDIT LIMIT EXCEEDED — PLEASE HOLD FOR ASSISTANCE

NILD – NAVIGATION IDENTIFIERS FOR
LOCATION DECODING

REENTER REQUEST MESSAGES:
INVALID AREA CODE - PLEASE REENTER
INVALID EXCHANGE NUMBER - PLEASE REENTER
INVALID PHONE NUMBER - PLEASE REENTER

DIRECTIONAL INFORMATION SYSTEM

BACKGROUND OF THE INVENTION

The invention relates to data processing methodology and apparatus for effecting an improved directional information system. More specifically, this invention is directed to a process and a system for rapidly and reliably obtaining desired routing directions for travel between geographic locations utilizing unique codified identifiers.

It is well known that travelers often have need for directions for traveling between geographic locations. Commonly used sources for direction include personal inquiry, printed directions from automobile clubs and published maps or directories. Other navigational devices are known from patent descriptions, such as U.S. Pat. Nos. 4,546,439 and 4,570,227. Additional recent developments in navigational devices utilizing data processing are known from Honey and Zavoli: "A Novel Approach to Automotive Navigation and Map Display", IEEE Proceedings of COMPCON 86, San Francisco, Calif. (Mar. 3–6, 1986). Such information sources can be difficult to understand, or be unreliable, inaccurate, outdated, or unavailable at the time the user needs them. Even recent navigational devices utilizing data processing, which may be more accurate and readily available, are hampered in their functional capabilities because of their limitations on acceptable forms of data entry information, i.e., alphanumeric rather than pure numeric, and additionally, because of their limitations in the geographic boundaries for which they can provide directions, i.e., statewide or nationwide rather than international. Electronic devices heretofore have also required significant investment in computers, terminals and communication facilities.

It is therefore an object of the present invention to provide a methodology and system whereby a user can obtain navigational directions between geographic locations by using any device which is capable of utilizing suitable codified identifiers such as an ordinary telephone, to access information stored in computer memory, so that the automatic system can present the navigational directions in logical units of understandable information to the user.

Another object of the invention is that the system provide accurately and expeditiously the desired navigational information while permitting authorized unskilled users to easily and readily access the system without requiring training and extensive manual intervention.

SUMMARY OF THE INVENTION

In accordance with the invention, the above described objects are accomplished by this invention by providing a system for automatically processing geographic location data entered as a sequence of numerical arrays through an input device by an authorized user which generates a code which is fed to a central processor. The entered code is organized as a number of field identifiers which comprise, respectively, a first predetermined number of digits of the input code, a second predetermined number of subsequent digits of the input code and the remaining digits of the input code. Collectively, these field identifiers make up what the inventors herein have termed a Navigation Identifier for Location Decoding, or NILD code. The central processor compares the entered codes with information stored in memory. The memory contains data bases concerning authorized user accounts, directory listings, geographic locations, and routing directions for traveling between geographic locations. As a result of the central processor's comparison, the processor determines from the first numerical sequence entered, the user access code, the desired route type such as fastest route, commercial route, hazardous materials route, and non-toll route. From the same access code the desired output mode is determined. Output devices can include telephones, personal computers, computer terminals, mainframes, printers, facsimiles, portable transceivers or cable television receivers. Lastly, the access code contains an account identification number from which the processor determines whether the user is an authorized user. Upon verification that the user is authorized, the processor determines from the remaining entered numerical array sequences where the geographic locations are located. These locations are verified by the user and thereafter routing directions between the locations are provided to the user through an output device preselected by the user.

For a better understanding of the present invention, together with other and further embodiments, reference is made to the following description, taken in conjunction with the accompanying drawings and its scope will be pointed out in the claims.

DESCRIPTION OF THE PREFERRED EMBODIMENT

Figure 11:
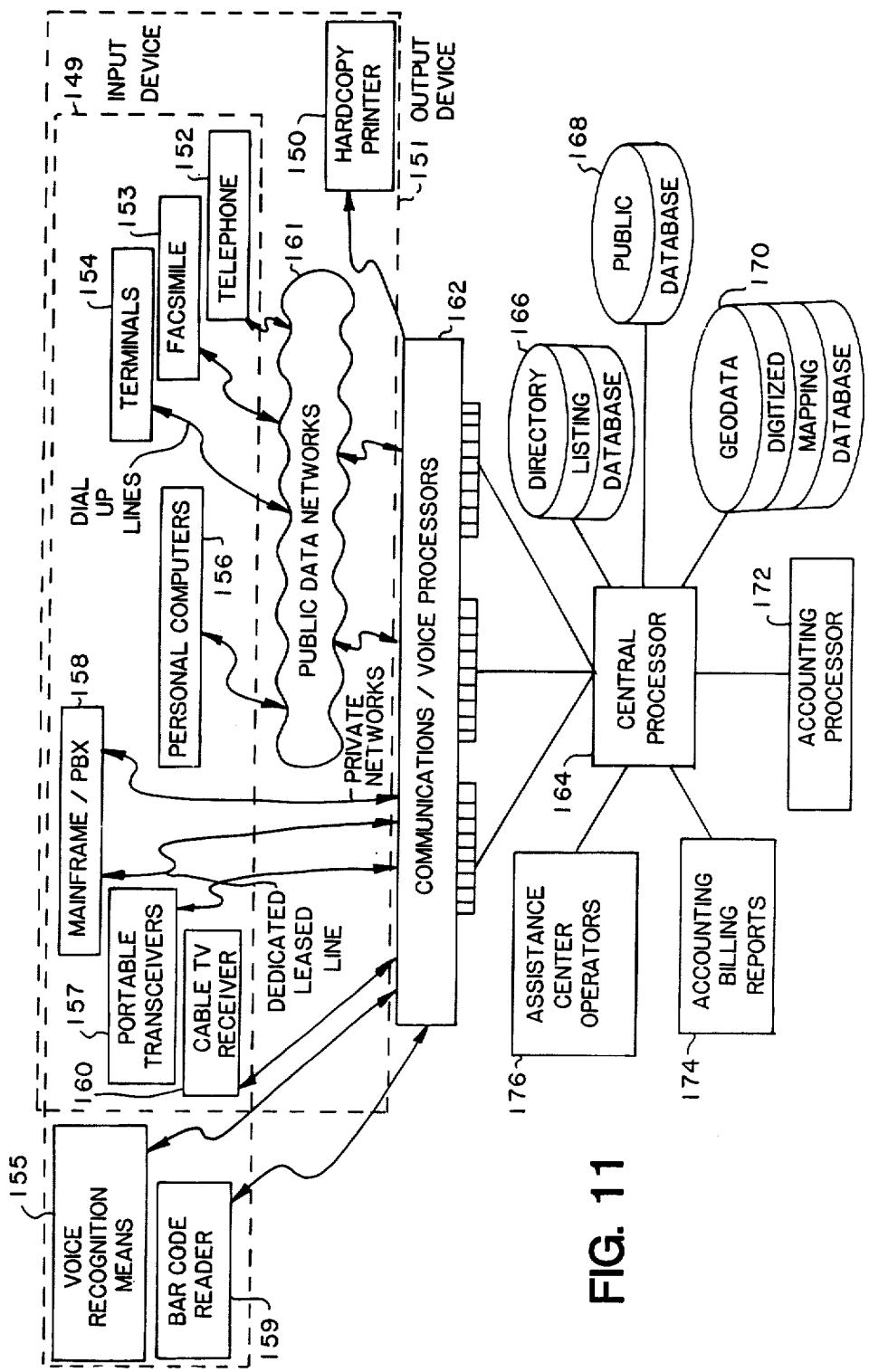
FIG. 11 is a functional block diagram of a directional information system in accordance with the present invention.

FIG. 11 is a functional block diagram illustrating an embodiment of the present invention. The system illustrated includes an input device 149 through which a user can enter information into the system. The input device 149 generates electrical signals for transmission to the communications/voice processors 162. Among the suitable commercially available devices for an input device 149 are the following: telephones 152, facsimiles 153, terminals 154, voice recognition means 155, personal computers 156, portable transceiver means 157, main frames/private branch exchange (PBX) switchboards 158, bar code readers 159 and cable television receivers 160. Suitable types of telephones 152 are those which have a touch-tone keypad which generates dual tone multi-frequency (DTMF) tones. Suitable types of facsimile 153 include CCITT Groups 1, 2, and 3. Suitable types of terminals 154 and personal computers 156 are those which can transmit electrical signals through communication interfaces such as modems, LANS, and other communications interface standards. Suitable main frames/PBX switchboards 158 are those of the type which employ one or more digital communications means such as serial digital links, T-1 channels, and fibre optic channels and the like. All input may go from the input device 149 to the communications/voice processors 162 through public data networks 161, i.e. local telephone company, or by other communication link such as two way or cable television. In the case of terminals 154, personal computers 156, mainframes/PBX switchboards 158, the input may go through private networks or dedicated leased lines or alternatively through public data networks 161.

The information entered by the user consists of a sequence of numerical arrays. The first array represents a user access code which also indicates the user's preferred type route and preferred type output. The remaining numerical arrays indicate identification numbers corresponding to geographic locations of origination and destination. The location identification numbers of the preferred type are telephone numbers. The central processor 164 receives through the communications/voice processor 162 the location identification numbers which were transmitted from the input device 149. In some arrangements, the identification of the user access code and of the origination identification number may be made by reference to the communication line on which the user accessed the system, and the identifying signals can be generated by the communication/voice processors 162.

The central processor 164 will retrieve from its accounting processor 172 information about the user which corresponds to the input user access code. Account status and credit status may be checked, and if the account is invalid, inactive, or the credit limit is exceeded the assistance center operators 176 will be notified and will proceed with manual intervention of the transaction. Additionally, the central processor 164 will retrieve the origination and destination identification numbers and correlate them to geographic locations, i.e. street addresses, stored in the directory listing database 166. The preferred directory listing database 166 is American Business Lists and is available from American Business Lists, Inc., 5711 S. 86th Circle, Omaha, Nebr. 68127. Other suitable sources for the directory listing database include the Fred Woolfe List Co., Ruben H. Donnelley, NYNEX, and Southwestern Bell.

The geographic location addresses are communicated to the user by data display on a terminal or vocally by digitized or synthesized voice. The user may then verify the location addresses for example by depressing a designated key. If the address for any identification number is incorrect or unavailable, for example, where a telephone number has been changed or discontinued, the system will automatically notify the assistance center operators 176 who will automatically provide manual operator intervention. The assistance center operator 176 may access a remote on-line public database 168 via communication lines to retrieve the most current directory listing and thereafter will update on-line the directory listing database 166. A suitable remote on-line directory listing database 166 is the on-line update service provided from American Business Lists, Inc., Omaha, Nebr. 68127.

Upon verification of the geographic location addresses, the central processor 164 will retrieve from the geodata digitized mapping database 170 routing data correlating to the geographic location addresses. The geodata digitized mapping database 170 is preferably the database available from Map Info Corp., 200 Broadway, Troy, N.Y. 12180. Other suitable sources for the geodata digitized mapping database 170 are available from the U.S. Geological Service, Geovision, Rand McNally, the U.S. Postal Service, and Geographic Data Technologies.

The central processor 164, in accordance with an algorithm which utilizes the retrieved routing data, generates routing directions for travel between the geographic location addresses. A suitable algorithm for this function is the Oakridge Highway Routing Model (the Routing Algorithm) available from the U.S. Geological Service (USGS) at Oakridge National Laboratories in Oakridge, Tenn. A description of the workings of the Routing Algorithm exists in an article entitled "Transportation, Networking, Routing and Modeling" published in a document entitled *A Review of Routing Techniques Applicable to Regional Analysis*, document No. ORNL-CSD-TM-226 at p. 67, authored by R. C. Durfee. The algorithm is designed to provide precise point-to-point routing directions between the geographic locations input by the user. The algorithm, by accessing the geographic information obtained from the geodata digitized mapping database 170, constructs detailed maps surrounding the origination and destination locations. Thereafter, these detailed maps are adjoined by routes constituting a contiguous path between the origination and destination locations while simultaneously satisfying the requirements of the desired route requested by the user, for example when the desired route requested is for the fastest route. Subsequent to the determination of the entire mapped route between the origination and destination locations, the entire mapped route is translated into user understandable routing directions in accordance with the pre-selected type of output format, for example, the routing directions will be translated into a human language such as English and presented to the user via an output device 151. Translation of the entire map route is transmitted from the central processor 164 through the communications/voice processors 162 to the output device 151. Suitable types of output devices 151 include devices previously described as suitable for an input device 149 excluding the voice recognition means 155 and the bar code reader 159. Additional suitable types of output devices 151 include a hard copy printer. The routing directions are formatted by the system to correspond to the input characteristics expected by the selected output device. The entire process for generating routing directions may cease or it may continue to generate other routes between other origination and destination location numbers as may be further requested by the user.

Retrieval of the location identification numbers and information located in the directory listing database 166 and the geodata digitized mapping database 170 is managed and coordinated by flat files and the relational operating database which is preferably Structured Query Language/2000 (SQL/2000) available from Stratus Computer Inc., 56 Fairbanks Blvd., Marlboro, Mass. 01752. Another suitable relational operating database is ORACLE available from Oracle Systems.

Finally, upon completion of a request by the user for routing directions, the user credit limit is updated by the accounting processor 172 and thereafter an accounting billing report 174 will be updated with the corresponding information to enable a billing report to be generated and issued to the user. The accounting processor functions 172 may be managed internally by the system or externally by third party resellers.

Figure 1A:
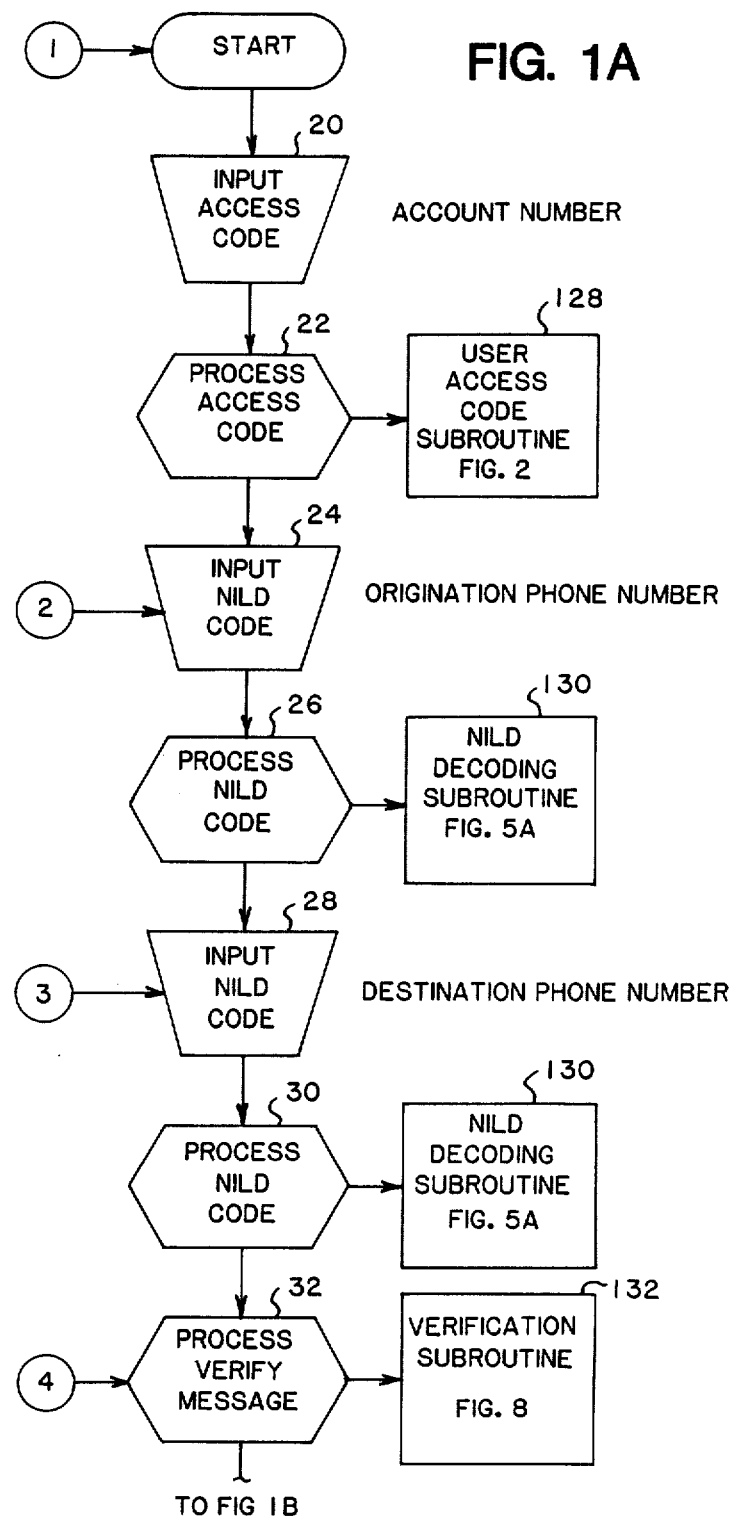
FIGS. 1A and 1B are respectively the upper and lower portions of a schematic flow chart depicting the data processing methodology and structure in accordance with the principles of the present invention for a directional information system.
Figure 1B:
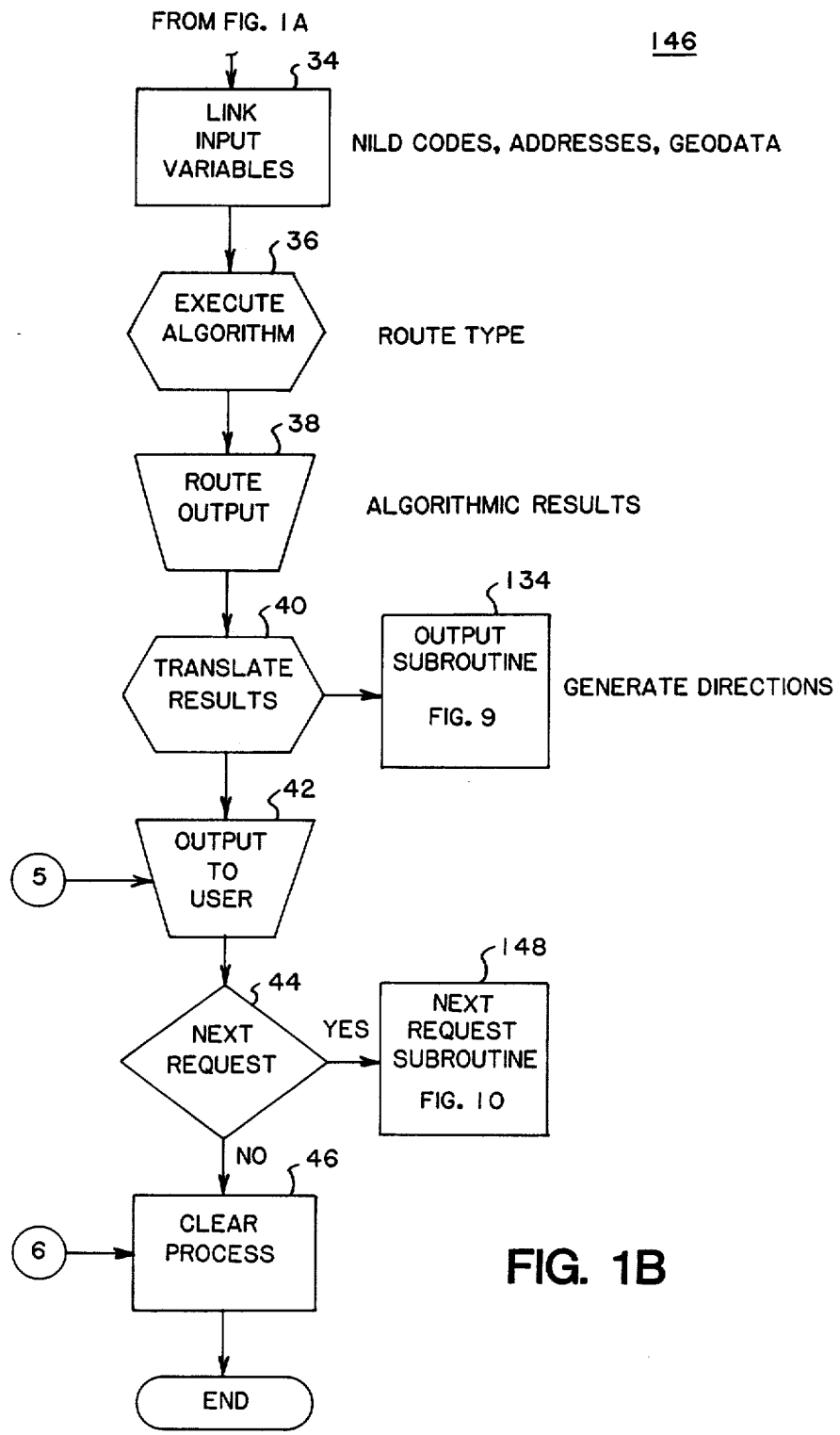

FIGS. 1A-1B are respectively the upper and lower portions of a flow chart illustrating the typical operation of a directional information system in accordance with the present invention as described above in relation to FIG. 11.

Figure 2:
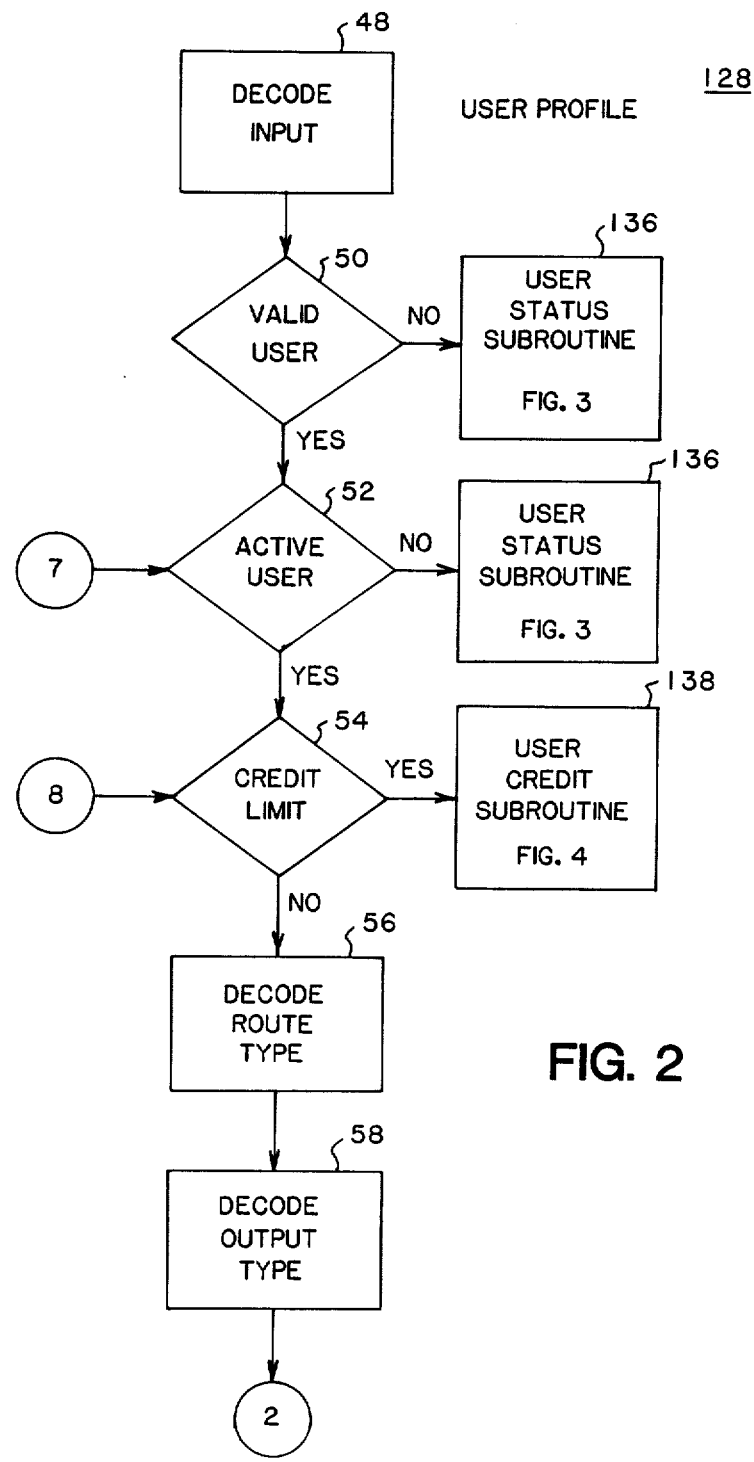
FIG. 2 is a flow chart illustrating the details of the user access code subroutine 128 used in the FIG. 1A system.
Figure 3:
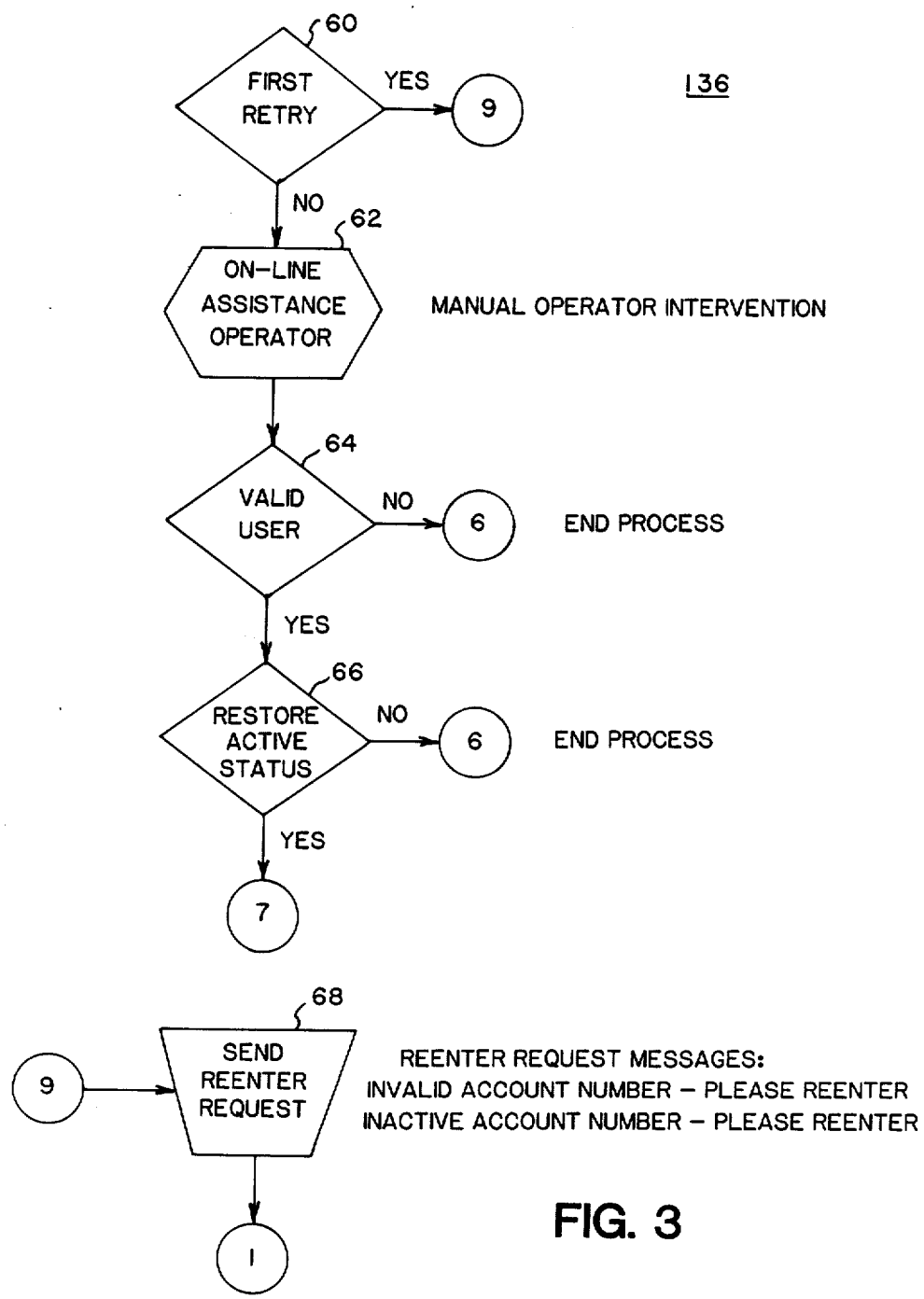
FIG. 3 is a flow chart illustrating the details of the user access code subroutine 136 used in the FIG. 2 system.

In one of the many practical applications of the present invention, the user first utilizes a touch-tone type phone and punches in on the numeric keypad a telephone number for entering the system. The user, at step 20, is welcomed to the system and is prompted by the system vocally through the use of a voice generation processor, which is well known in the industry, to enter an access code. The access code may be in the form of seven digits in which the first digit denotes a desired type of route, the second digit denotes a desired type of output, and the remaining five digits denote an account identification number. The access code is then processed at step 22 by entering a user access code subroutine 128 which is shown in greater detail in FIG. 2. The system proceeds to decode the input code at step 48. A check is made that the access code contains a valid user account identification number at step 50. The input access code is checked against a file listing of all access codes. Absence of the access code from the file listing indicates an unauthorized user. An authorized user transaction is then checked to determine whether the user's account is active at step 52. An unauthorized user transaction is processed through the user status subroutine 136 which is shown in greater detail in FIG. 3. The system proceeds to check whether the user has retried to enter the access code, and the if user has not, the user is permitted a first retry at step 60 and the user, at step 68, is vocally prompted over the telephone receiver with a message to reenter the access code. The reentered access code is processed the same as the first input access code which was entered into the system at step 20 of FIG. 1A.

If it is determined at step 60 that a first retry has already been made by the user then an on-line assistance operator 62 will be notified and will proceed with manual intervention of the transaction. The on-line assistance operator 62 will check at step 64 to see if the user is an authorized user, and if the user is not, the process will end with the entire process being cleared from the system at step 46 of FIG. 1B. If the user is authorized, the on-line assistance operator will determine whether to restore the user's account to an active status at step 66 of FIG. 3. If the user's account is not restored to active status the process will end with the entire process being cleared from the system at step 46 of FIG. 1B. If the user's account is restored to active status, then the automatic, rather than manual, processing of the system will resume. Thereafter, the transaction resumes processing through the system in the same manner in which an authorized user transaction is processed, by the user's account being checked at step 52 of FIG. 2 to confirm that the user account is active. If the authorized user does not have an active account, the transaction is processed through the user status subroutine 136 in the same manner as discussed above. If the authorized user has an active account, the system checks its accounting records at step 54 of FIG. 2 to determine whether the account has exceeded a credit limit. If the credit limit is not exceeded the user access code is decoded to determine the preferred route type at step 56.

Figure 4:
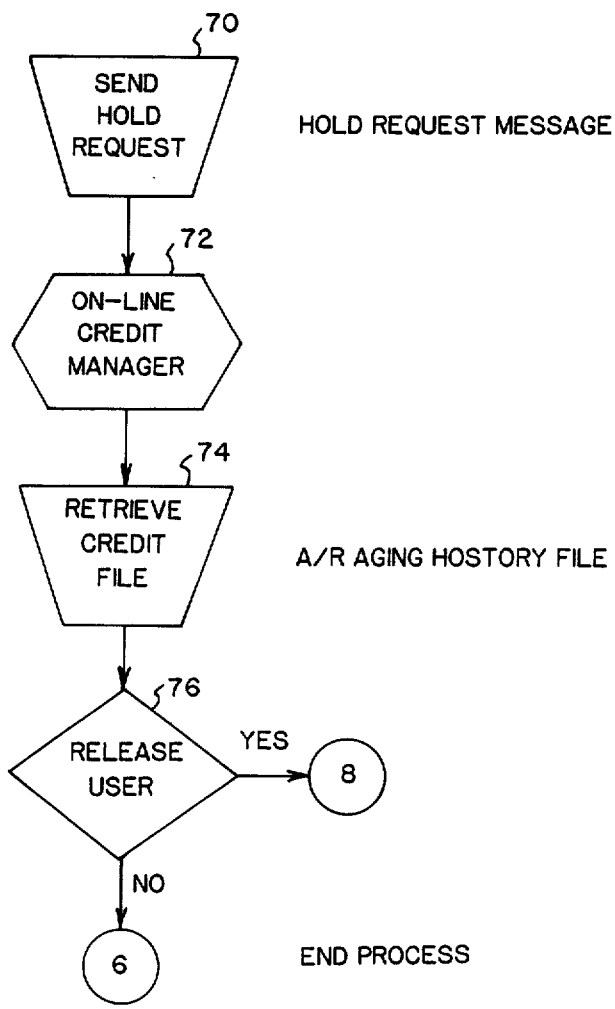
FIG. 4 is a flow chart illustrating the details of the user access code subroutine 138 used in the FIG. 2 system.

If the credit limit is exceeded the transaction is processed through the user credit subroutine 138 which is shown in greater detail in FIG. 4. The system proceeds to send a message to the user at step 70 informing the user that the credit limit is exceeded and to hold for assistance. An on-line credit manager will intervene at step 72 and may retrieve a credit file on the user's account at step 74. Upon reviewing the credit file, a determination is made by the credit manager 72, at step 76, whether to release credit to the user's account. If a release is not made, the process will end by clearing the system at step 46 of FIG. 1B. If a release is made, a credit limit check is remade at step 54 of FIG. 2 and processed in the same manner as the first credit check. When a proper release of the credit has been made, the transaction resumes processing through the system in the same manner as a transaction where the credit limit was initially determined not to have been exceeded. Thus, the user access code is decoded at step 56 to determine the preferred route type.

In decoding the preferred route type from the user access code subroutine 128, the preferred route type, for example, may be a "1" to indicate fastest route, a "2" to indicate commercial route, a "3" to indicate hazardous route or "4" to indicate non-toll route. The process continues and the access code, at step 58, will then be decoded to determine preferred output type. For example, the preferred output type may be a "1" to indicate hard copy or facsimile printed output, a "2" to indicate voice output, "3" to indicate visual cable television output or a "4" to indicate hard copy or facsimile output printed and voice output.

After decoding the output type at step 58, the user is vocally prompted over the telephone receiver with a message to input at step 24 of FIG. 1A a phone number, which the system recognizes as a Navigation Identifier for Location Decoding (NILD) code, to designate a point of origination for the routing directions being requested. Said NILD code may be, for example, the telephone number of a client's office from where the user is calling. In this instance the first field identifier would consist of the area code or ACODE 10, the second field identifier would consist of the exchange code or EXCODE 7, and the third field identifier would consist of the location code or LOCODE 04. In some arrangements, such as when a user calls up the system from a hotel which has a dedicated communication line linked to the system, the identification of the user access code and of the point of origination for directions may be made by reference to the communication line on which the user accessed the system. Assuming the NILD code is a telephone number, the phone number is then processed at step 26 by entering a NILD decoding subroutine 130 which is shown in greater detail in FIG. 5A. The system proceeds to decode the input phone number at step 78. First, the three numbers indicating the area code ACODE 10 are decoded from the input phone number at step 80. A check is made at step 82 to determine whether the area code is valid. The area code is checked against a file listing of all valid area codes. Upon a valid area code determination, the system proceeds by decoding the exchange code EXCODE 7 numbers at step 84, i.e., the next three numbers in the telephone number, as will be discussed further below.

Figure 5A:
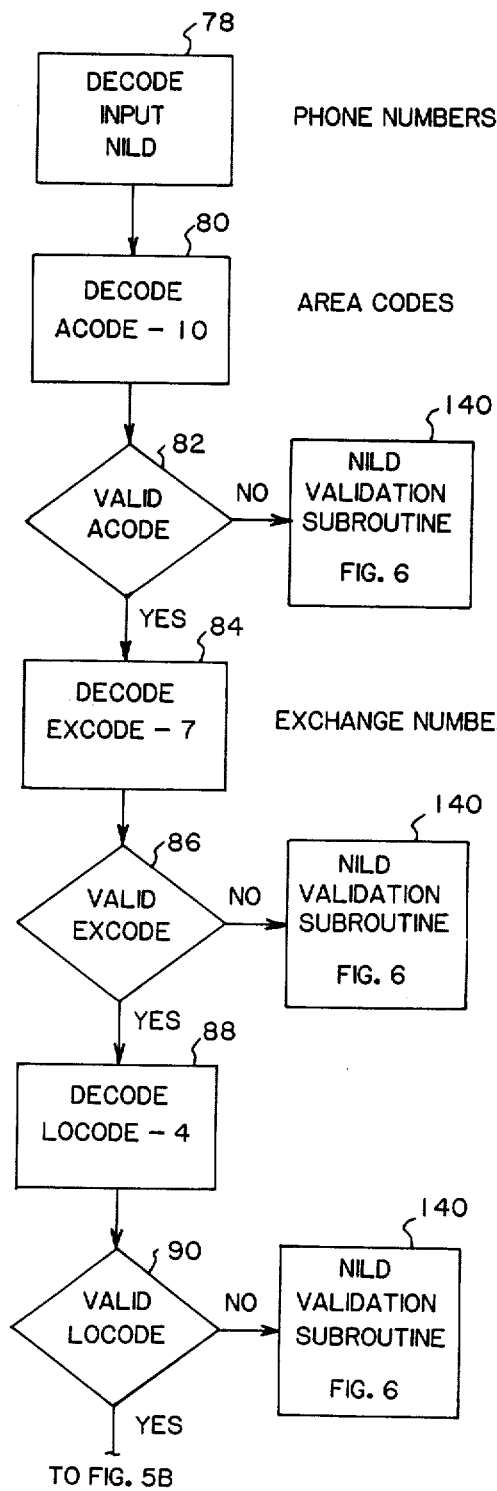
FIGS. 5A and 5B are respectively the upper and lower portions of a flow chart illustrating the details of the NILD decoding subroutine 130 used in the FIG. 1A system.
Figure 6:
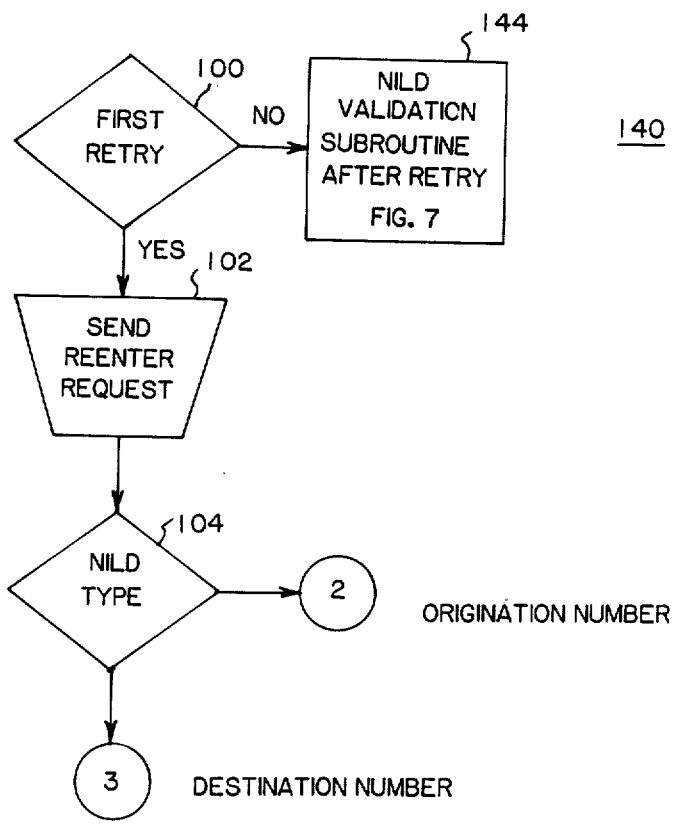
FIG. 6 is a flow chart illustrating the details of the NILD validation subroutine 140 used in the FIG. 5A system.
Figure 7:
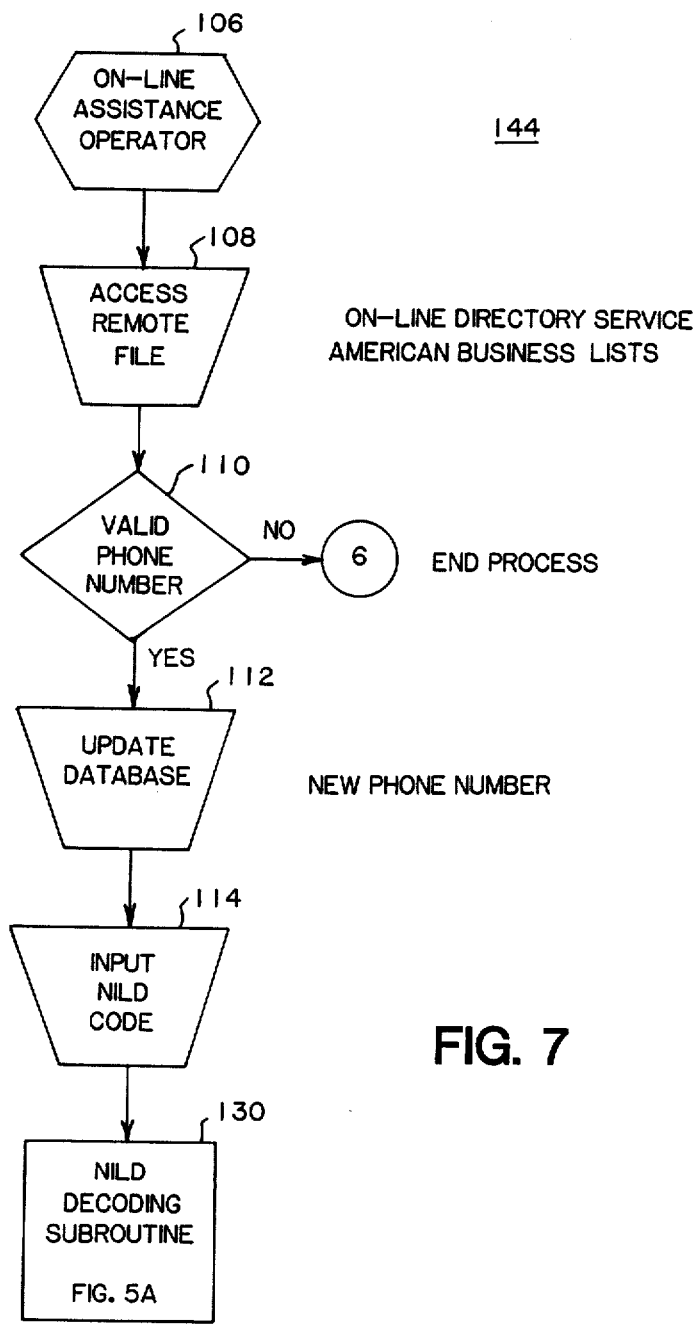
FIG. 7 is a flow chart illustrating the details of the NILD validation subroutine after retry 144 used in the FIG. 6 system.

An invalid area code is processed through the NILD validation subroutine 140 which is shown in greater detail in FIG. 6. The system proceeds to check whether the user has retried to enter another telephone number. If it is determined at step 100 that the user has already retried entering another phone number, the transaction proceeds to the NILD validation subroutine after retry 144 which is shown in greater detail in FIG. 7. The system proceeds to notify an on-line assistance operator 106 who will proceed with manual intervention of the transaction. The on-line assistance operator 106 may access a remote file 108 such as the on-line directory service of American Business Lists. The on-line assistance operator 106 will check to see if the phone number is a valid phone number 110 and if not the process will end with the entire process being cleared from the system at step 46 of FIG. 1B. If the phone number is valid, the on-line assistance operator 106 will update, at step 112 of FIG. 7, the database 112 which contains a telephone directory listing such as American Business Lists. The new phone number will be input into the system by the operator 106 as a NILD code at step 114 and the automatic, rather than manual, processing of the system will resume. Thereafter, the transaction resumes processing through the system by entering the NILD decoding subroutine 130 of FIG. 5A and is processed in the same manner as discussed above regarding the subroutine 130 of FIG. 5A.

If it is determined by the NILD validation subroutine 140 of FIG. 6 that the user has not retried to enter another telephone number, the user is permitted to enter another number and the user, at step 102, is vocally prompted over the receiver with a message to reenter another phone number. A check is made at step 104 to determine whether it represents a number identifying the point of origination or the point of destination for the desired routing direction. If the phone number represents a point of destination, the number will enter the system at step 28 of FIG. 1A and will be processed at step 30 through the NILD decoding subroutine 130 in the same manner as the origination phone number is processed through the NILD decoding subroutine 130. Additional discussion regarding the processing of a destination phone number will be discussed further below.

If the input phone number represents a point of origination, the number will be entered into the system at step 24 of FIG. 1A and processed at step 26 through the NILD decoding subroutine 130 as previously discussed. Assuming at this point in the processing that the phone number has a valid area code at step 82 of FIG. 5A during the processing of the NILD decoding subroutine 130, the system proceeds by decoding at step 84 of FIG. 5A, the exchange code numbers EXCODE 7, i.e. the next three numbers in the telephone number.

In decoding the exchange code from the phone number, a check is made at step 86 to determine whether the exchange code is valid. The exchange code is checked against a file listing of all valid exchange codes. Upon a valid exchange code determination, the system proceeds by decoding the location code LOCODE 4 numbers at step 88, i.e. the remaining four numbers in the telephone number, as will be discussed further below.

An invalid exchange code EXCODE 7 is processed through the NILD validation subroutine 140 in the same manner as the invalid area code ACODE 10 was processed through the NILD validation subroutine 140. In order to illustrate the entire system process it will be assumed that eventually a valid area code ACODE 10 and exchange code EXCODE 7 are input into the NILD validation subroutine 140 which will result in the system proceeding by decoding the location code LOCODE 4 numbers at step 88, i.e. the remaining four numbers in the telephone number.

In decoding the location code LOCODE 4 from the phone number, a check is made at step 90, to determine whether the location code is valid. The location code is checked against a file listing of all valid location codes. Upon a valid location code determination, the system proceeds to step 92 of FIG. 5B and retrieves from the database containing directory listing information, such as, American Business Lists, the address corresponding to the telephone number. The system proceeds to step 94 as will be discussed further below.

An invalid location code LOCODE 4 is processed through the NILD validation subroutine 140 of FIG. 5A in the same manner as the invalid exchange code EXCODE 7 was processed through the NILD validation subroutine 140. In order to illustrate the entire system process it will be assumed that eventually a valid area code ACODE 10, exchange code EXCODE 7, and location code LOCODE 4 are input into the NILD validation subroutine 140 which will result in the system proceeding to step 92 of FIG. 5B and retrieves from the database containing directory listing information, such as, American Business Lists, the address corresponding to the telephone number. The system proceeds to step 94.

Figure 5B:
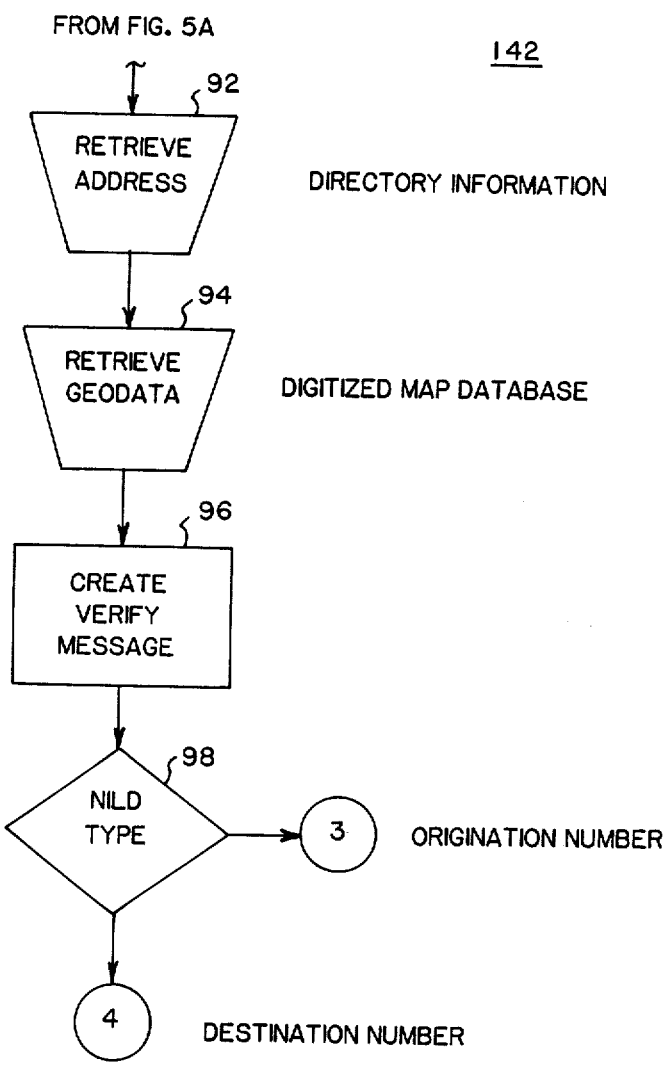

In proceeding to step 94 of FIG. 5B, the system, from the database containing geographic data in the form of digitized maps, retrieves routing data correlating to the previously retrieved addresses. Preferably, the geodata digitized mapping databases are from Map Info, Troy, N.Y. The system proceeds to step 96 and begins to create an address verification message by storing into a memory buffer the data which was retrieved from the databases at step 92 and step 94. A check is made at step 98 to determine whether the input phone number represents a number identifying the point of origination or the point of destination for the desired routing directions. If the phone number represents a point of origination, the user is vocally prompted over the receiver with a message to enter another phone number representing the point of destination for the desired routing directions. The destination number will be entered into the system at step 28 of FIG. 1A and will be processed at step 30 through the NILD decoding subroutine 130 in the same manner as the origination phone number is processed through the NILD decoding subroutine 130. In order to illustrate the entire system process it will be assumed that eventually a valid destination phone number is input into the system. This will result in the system proceeding to the same check point at step 98 of FIG. 5B where the system will determine whether the phone number represents a point of origination or destination.

Figure 8:
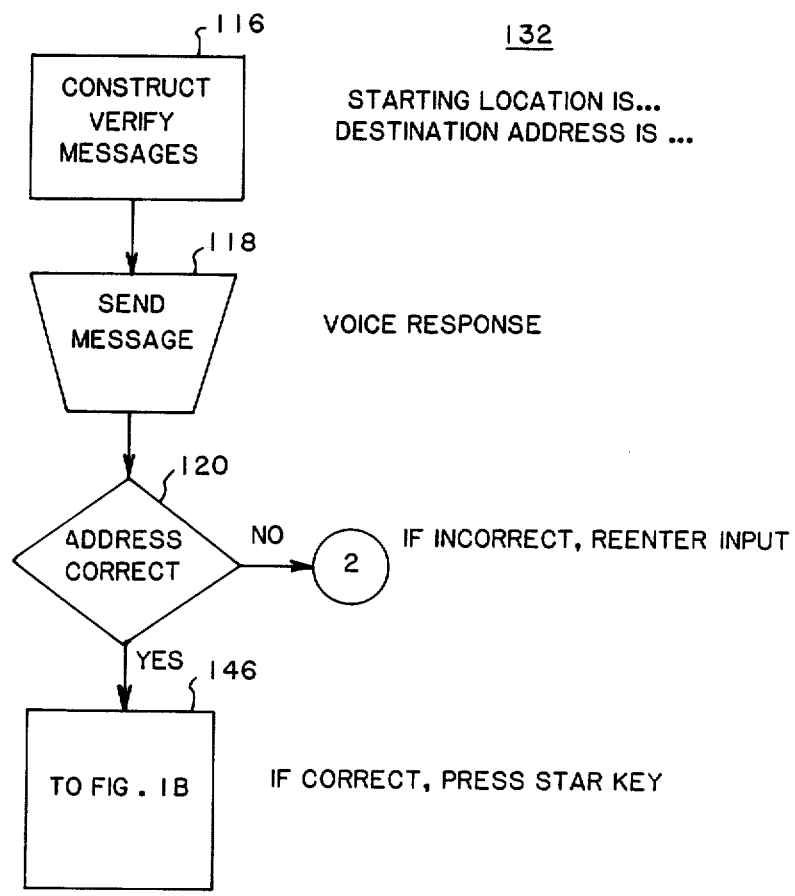
FIG. 8 is a flow chart illustrating the details of the verification subroutine 132 used in the FIG. 1A system.

Upon a determination at step 98 that the phone number represents a point of destination, the system, at step 32 of FIG. 1A, processes the information retrieved from the database by entering a verification subroutine 132 which is shown in greater detail in FIG. 8. The system, at step 116, proceeds to construct a message for the user to verify that the origination and destination addresses are correct. The message is vocally sent to the user at step 118. The user determines at step 120 whether the origination address and the destination address are correct. If either address is incorrect, the user is vocally prompted over the telephone receiver to input, at step 24 of FIG. 1A, a phone number representing a point of origination for the desired routing directions. The entire system process proceeds from step 24 in the same manner as previously discussed above.

If both addresses are correct, the user is vocally prompted over the telephone receiver to verify the correctness by pressing a key, such as the star (*) key, at step 146 of FIG. 8. Thereafter, the system, at step 34 of FIG. 1B, links the input data, the retrieved address data, and the retrieved geographic map data. The linked data, at step 36, is input into an algorithm, such as the Oakridge Highway Routing Model, which generates routing directions for travel between the geographic addresses. The algorithm, utilizing the linked data, constructs detailed maps surrounding the points of origination and destination for the desired routing directions. Subsequently, these maps are adjoined by routes constituting a contiguous path between the points of origination and destination and which routes also satisfy the requirements of the desired route requested by the user, such as a non-toll route. Ultimately, the algorithm will determine the best route to satisfy the requirements of the desired route and that route will be generated at step 38 as the final output of the algorithm. The route which is output from the algorithm is generated in the form of character strings which represent "x" and "y", (x,y), coordinates for points, geographic locations, to be traveled on the route between the points of origination and destination. The points represented by the (x,y) coordinates may be, for example, the point at which a traveler has to make a right turn at an intersection or the point at which a traveler has to exit from a major highway.

Figure 9:
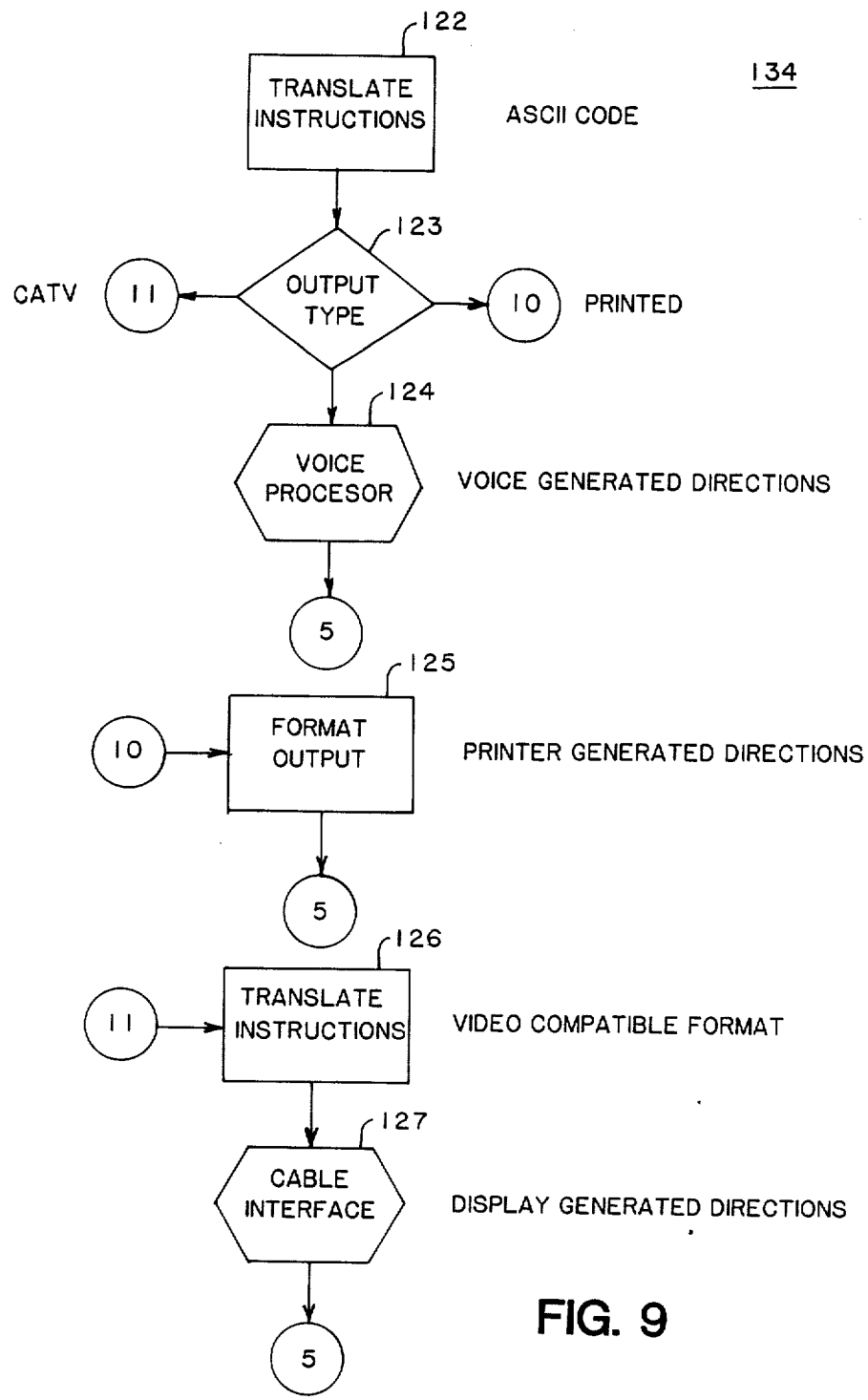
FIG. 9 is a flow chart illustrating the details of the output subroutine 134 used in the FIG. 1B system.

The output route is then processed for translation at step 40 by entering an output subroutine 134 which is shown in greater detail in FIG. 9. The system proceeds to translate the routing directions at step 122. The incoming (x,y) coordinates which are represented in the digital form of 0's and 1's are translated into alphanumeric characters, ASCII form, such that one byte of 0's and 1's is translated into one alphanumeric character. The alphanumeric characters, thus, form words in a human language, such as English, which constitute routing directions. These routing directions, although somewhat intelligible for the user, may be in a form similar to broken English. For example, the routing direction may say "Left Bernal Rd Bernal Rd 0.5 miles". In order to transform the broken English into a more commonly understood form, the routing directions are further enhanced by a subroutine which performs an analysis resulting in additional commonly used phrases to be added to the broken English. Such phrases may include the following words: continue, proceed, from, to, onto, bear and take, and these phrases will be stored in a dictionary of the commonly used phrases. An example of the broken English routing direction "Left Bernal Rd Bernal Rd 0.5 Miles." may be the enhanced phrasing "Bear Left on Bernal Rd, continue on Bernal Rd 0.5 miles". These enhancement subroutines can be accomplished by any number of well known data processing techniques such as paragraph assembly.

Subsequent to the system translating the routing directions at step 122, the system proceeds to check, at step 123, to determine which type of preferred output is requested by the user. If the routing directions are to be related vocally over the telephone receiver, a voice generation processor, which is well known in the industry is utilized at step 124 to translate vocally the directions prior to outputting them to the user at step 42 of FIG. 1B. If the routing directions are to be related as printed directions, such as when outputting to a hard copy printer or facsimile, the system, at step 125 of FIG. 9, will format the routing directions prior to outputting them in printed form to the user at step 42 of FIG. 1B. If the routing directions are to be related visually in video output, such as when outputting to a cable television receiver, the routing direction data is converted at step 126 into the appropriate compatible data form for the cable interface. For example, the routing directions represented in ASCII code may be converted to digital output which is then converted to analog output to be used by the cable system. The converted routing directions, thereafter, are presented at step 127 to the cable interface for utilization in generating a display of the directions to be output to the user at step 42 of FIG. 1B.

Subsequent to the routing directions being output to the user at step 42 of FIG. 1B, the user, at step 44, is vocally prompted over the phone receiver with a message to indicate whether any other requests for routing directions are desired, and if so, to depress a designated key, such as the one "1" key to indicate that a new route is requested or the two "2" key to indicate that a continuation route is requested, and if not, to depress another designated key, such as the star "*" key. If no more directions are desired, the processing of the transaction will end with the entire process being cleared from the system at step 46 of FIG. 1B. If more directions are desired, the system will enter the next request subroutine 148 which is shown in greater detail in FIG. 10. The system proceeds to check at step 180 whether the user is requesting a new route which is separate from the previously requested route or whether the user is requesting a continuation route of the previously requested route. If the user is requesting a new route, the processing of the previous request for routing directions will end with the entire process being cleared from the system at step 186. Thereafter, the processing of the new request for routing directions begins with the system proceeding to recommence processing a new transaction at step 24 of FIG. 1A.

Figure 10:
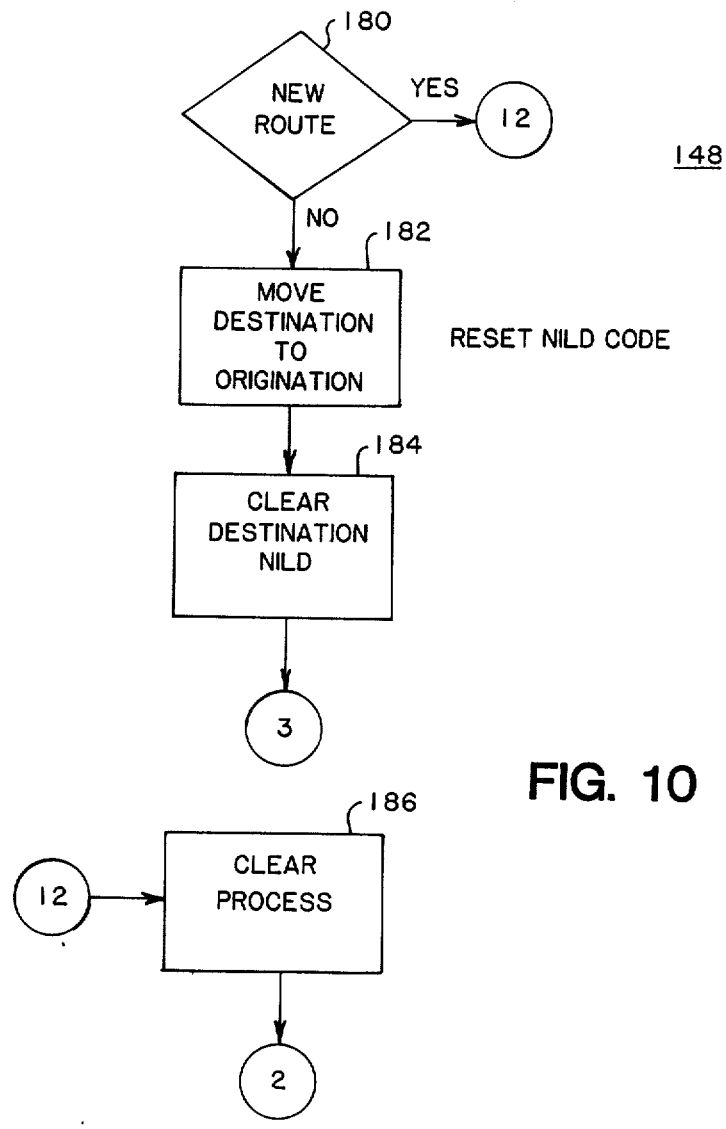
FIG. 10 is a flow chart illustrating the details of the next request subroutine 148 used in the FIG. 1B system.

If the user is requesting a continuation route of the previously requested route, the data information relating to the previously input destination point will be moved by the system, at step 182 of FIG. 10, into the location in memory for storing retrieved data information relating to the point of origination for the desired routing directions. Thereafter, the location in memory storing the retrieved data information relating to the previously input destination point will be cleared from the system at step 184. The system recommences processing the transaction from step 28 of FIG. 1A in the same manner as the previous request for routing directions was processed.

During the processing of the transaction as previously described above, if at anytime the user's communication line is disconnected from the system, and the processing of the transaction will end with the entire process being cleared from the system at step 46 of FIG. 1B.

The above description of the flow chart illustrating the typical operation of a directional information system in accordance with the present invention, may readily be converted by a programmer skilled in the art of programming an applications program in a computer language. The preferred language for programming the system in is C language because this language is easily transferable and usable with most operating systems. The directional information system in accordance with the present invention may be operated by a conventional operating system of a commercially available computer. The preferred operating system is UNIX from AT&T Bell Labs because this system is virtually hardware independent and is readily transferrable to a variety of computer systems. Other suitable sources for the operating system includes the Berkeley UNIX System 5 from the University of Southern California.

In the case where the portable transceiver means 157 is used as the input device 149, the operation of the aforementioned application in which the user utilizes a telephone is exactly the same with the exception that the interaction between the user and the system takes place through the portable transceiver means 157.

Figure 12:
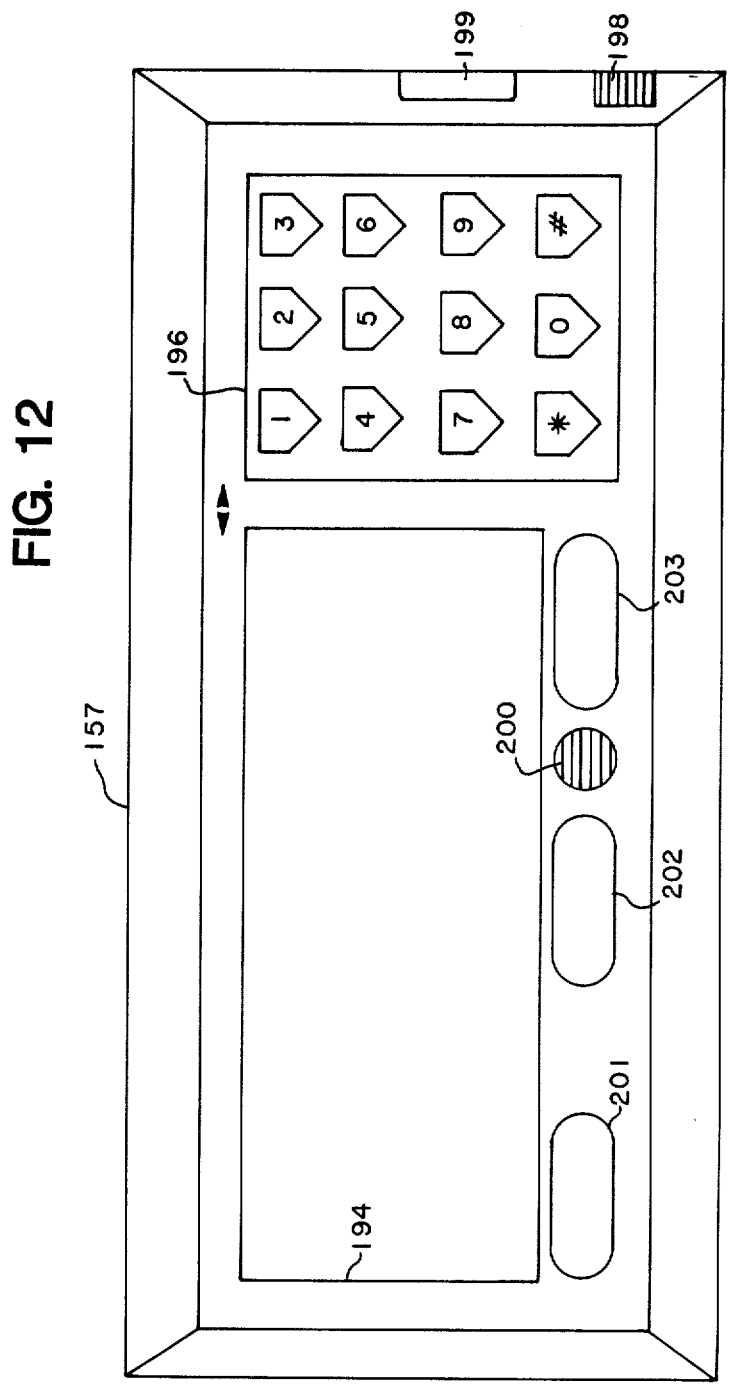
FIG. 12 is a front view illustrating one embodiment of the portable transceiver apparatus according to the present invention.
Figure 13:
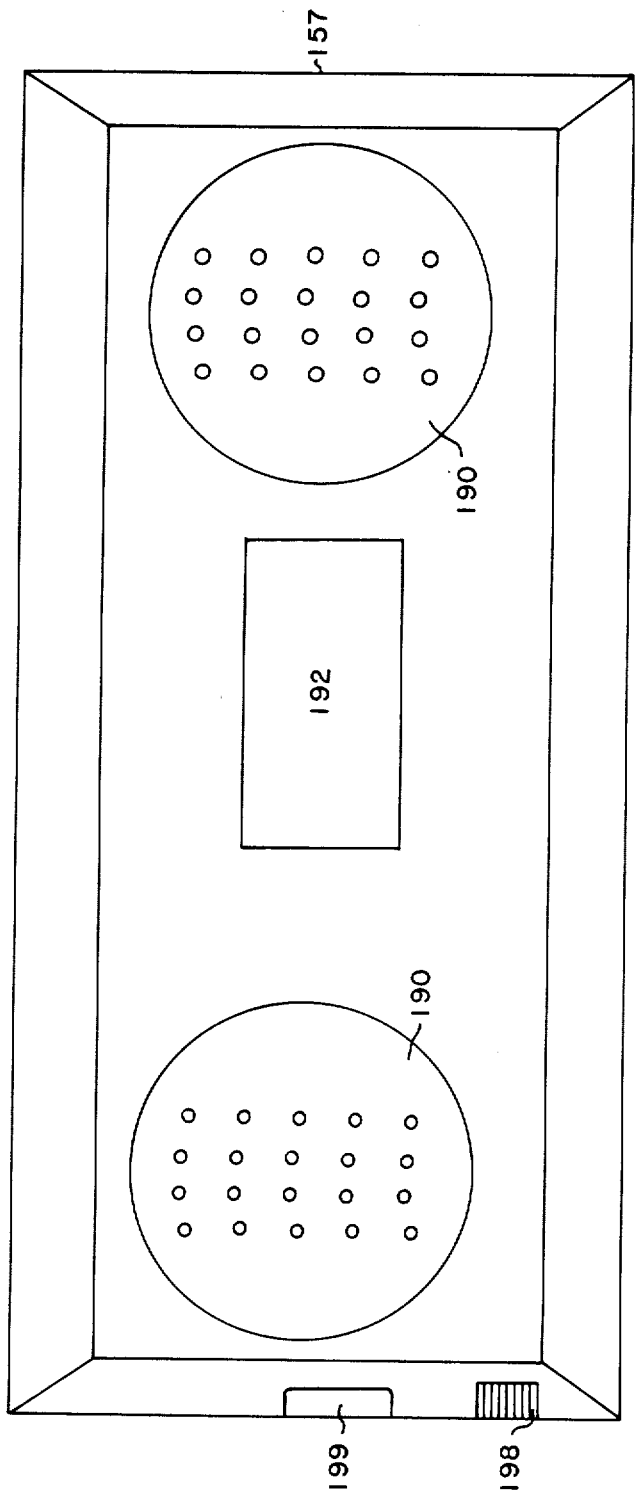
FIG. 13 is a back view illustrating one embodiment of the portable transceiver apparatus according to the present invention.

With reference to FIGS. 12 and 13, portable transceiver means 157 includes an acoustic coupler 190, power supply means 192, display means 194, key pad 196, communication interface receptacles 198 and 199 and processor and memory storage means, both not shown.

In a typical operation the portable transceiver 157 is attached to a phone line either through attachment of the phone receiver to the acoustic coupler 190 or by direct connection to the phone line via telecommunication receptacle 198, which is a standard RJ11 connector. Alternatively, communication between the system and the portable transceiver 157 can be established through a communication receptacle 199 which can be a RS-232C-format type connector or other similar interface standard.

Once coupled, the operation of the system is the same as previously described. The user will enter any data to the system through key pad 196. The processor means of the portable transceiver will collect, process and transmit the data to the system in the required format through coupler 190 or communication receptacles 198 or 199. Any prompts or requests from the system which were vocally presented to the user in the case where a telephone is used as the input device are received by the portable transceiver 157 through the communication receptacles 198 or 199 and displayed by the transceiver processor on display means 194. The prompts or requests from the system are therefore presented to the user alphanumerically on display 194 instead of vocally.

The user can then respond and interface with the system through key pad 196.

Alternatively, the prompts or requests from the system can also be supplied to the user vocally through the speaker 200 on portable transceiver 157. In this instance, the transceiver processor will receive the prompts or requests from the system through coupler 190 or communications receptacles 198 or 199 and process the data into a digitized or synthesized voice signal and supply it vocally to the user through speaker 200.

When the point in the interaction between user and system at which the routing data is to be transmitted is reached, the entire routing data is sent by the system to the portable transceiver 197 and stored in the transceiver's memory. The user can then exercise special function keys 201, 202 and 203 to scroll through the directions and to perform enhanced viewing functions such as zoom, reset, change contrast and the like. A special lost-unlost function can also be invoked through function keys 201, 202 and 203. The routing directions downloaded and stored into the transceiver memory also contain a list of intersections the user should have encountered while travelling on the route supplied. Should the user become lost, activation of the lost-unlost function will allow the user to backtrack through the intersections that should have been encountered and determine at which point they became lost.

The power supply means 192 of the portable transceiver 157 may be an AC-adapter, conventional rechargeable or non-rechargeable batteries, a removable or replaceable battery pack or a car battery coupled through an appropriate interface, such as a lighter-plug.

In the instance where the portable transceiver 157 is used as the input device, the aforementioned notification and manual intervention of an on-line assistance operator cannot be effectively carried out. In this case the system responds by sending a message through the transceiver 157 to the user which instructs the user to seek manual assistance by calling an on-line assistance center operator 176 of FIG. 11. In all other respects the methodology and operation of the system are the same with the portable transceiver as with other types of input devices.

Obviously, many modifications and variations of the present invention are possible in light of the above teachings. It is therefore to be understood that within the scope of the appended claims, the present invention may be practiced otherwise than as specifically described herein.

We claim:

1. A system for providing routing directions for travel between locations, comprising:
   data entry means for supplying first identification number data corresponding to a first location and for entering request data comprising a request for directions, said request data including second identification number data corresponding to a second location;
   a data processing system, for receiving data from said data entry means, said system including:
   (a) a first data base comprising data correlating identification numbers to geographic locations;
   (b) a second data base comprising geographic location data and route data;
   (c) a direction generating program for generating routing data using supplied location data and said second data base and (d) an operating program for obtaining location data corresponding to said first and second identification numbers from said first data base, for supplying said location data to said direction generating program and for obtaining said routing data;

and routing direction output means for supplying user understandable routing directions in response to said routing data.

2. Apparatus as specified in claim 1 wherein at least one of the data entry means is a telephone which generates dual tone multi-frequency (DTMF) data.

3. Apparatus as specified in claim 1 wherein at least one of the data entry means is a computer terminal.

4. Apparatus as specified in claim 1 wherein at least one of the data entry means is a computer.

5. Apparatus as specified in claim 1 wherein at least one of said data entry means comprises a telephone which generates dual tone multi-frequency and wherein said routing direction output means comprises a voice generation processor for voice routing directions and supplying said voice directions to said telephone.

6. Apparatus as specified in claim 1 wherein said routing direction output means comprises means for generating television signals for display of routing directions and a cable television system for distributing and forming said display.

7. Apparatus as specified in claim 1 wherein at least one of the data entry means is a portable transceiver means including processor means, data entry means for inputting said request data to said processor means, transmission communication means responsive to said processor means for transmitting the data to said data processing system, receiving communication means for receiving said supplied routing directions and display means for displaying said routing directions.

8. Apparatus as in claim 7 wherein said transmission means and said receiving means comprise an acoustic telephone coupler.

9. Apparatus as in claim 8 wherein said display means is a liquid crystal display.

10. Apparatus as in claim 8 wherein said display means is an auditory display.

11. A system as specified in claim 1 wherein said first and second identification number data comprise telephone numbers and wherein said first data base comprises data correlating telephone numbers to geographic locations.

12. A method for providing routing direction for travel between locations, comprising the steps of:

providing a data processing system for receiving data and including:
  (a) a first data set comprising data correlating identification numbers to geographic locations;
  (b) a second data set comprising geographic location data and route data;
  (c) a direction generating program for generating routing data using supplied location data and said second data set and
  (d) an operating program for obtaining location data corresponding to a first and second identification number from said first data set, for supplying said location data to said direction generating program and for obtaining said routing data;

Supplying a first identification number corresponding to a first location to said data processing means;

supplying request data comprising a request for directions to said data processing means, said request data including a second identification number corresponding to a second location;

operating said operating program to obtain location data from said first data set, to supply said location data to said direction generating program and for obtaining said routing data; and supplying said routing data to a user in the form of human understandable directions.

13. Method as specified in claim 7 wherein said first identification number is supplied in the form of dual tone multi-frequency data (DTMF).

14. Method as specified in claim 7 wherein said request data entry is supplied in the form of dual tone multi-frequency data (DTMF).

15. A method as specified in claim 11 wherein said data processing system is adapted to receive telephone numbers and wherein said first data set comprises data correlating telephone numbers to geographic location.

* * * * *